United States Patent
Sakai (10) Patent No.: US 11,165,060 B2
(45) Date of Patent: Nov. 2, 2021

(54) CATHODE ACTIVE MATERIAL, ITS PRODUCTION PROCESS, AND POSITIVE ELECTRODE FOR LITHIUM ION SECONDARY BATTERY

(71) Applicant: SUMITOMO CHEMICAL COMPANY, LIMITED, Tokyo (JP)

(72) Inventor: Tomohiro Sakai, Tokyo (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 225 days.

(21) Appl. No.: 16/301,699

(22) PCT Filed: May 22, 2017

(86) PCT No.: PCT/JP2017/019062
§ 371 (c)(1),
(2) Date: Nov. 14, 2018

(87) PCT Pub. No.: WO2017/204164
PCT Pub. Date: Nov. 30, 2017

(65) Prior Publication Data
US 2019/0296347 A1 Sep. 26, 2019

(30) Foreign Application Priority Data
May 24, 2016 (JP) .............................. JP2016-103134

(51) Int. Cl.
*H01M 4/00* (2006.01)
*H01M 4/505* (2010.01)
(Continued)

(52) U.S. Cl.
CPC ........... *H01M 4/505* (2013.01); *H01M 4/525* (2013.01); *H01M 10/0525* (2013.01); *H01M 2004/028* (2013.01)

(58) Field of Classification Search
CPC ...................................................... H01M 4/00
See application file for complete search history.

(56) References Cited

U.S. PATENT DOCUMENTS

2004/0091779 A1* 5/2004 Kang .................... H01M 4/131
429/231.1
2007/0160906 A1 7/2007 Tooyama et al.
(Continued)

FOREIGN PATENT DOCUMENTS

CN 101916843 A 12/2010
CN 105247709 A 1/2016
(Continued)

OTHER PUBLICATIONS

Notification of Transmittal of Translation of the International Preliminary Report on Patentability dated Dec. 6, 2018 from corresponding International Application No. PCT/JP2017/019062.
(Continued)

*Primary Examiner* — Jacob B Marks
(74) *Attorney, Agent, or Firm* — McDermott Will & Emery LLP (57) ABSTRACT

To provide a cathode active material with which it is possible to obtain a lithium ion secondary battery having a high discharge capacity and being excellent in the cycle characteristic, and its production process. A cathode active material, comprising particles of a lithium-containing composite oxide, the lithium-containing composite oxide being represented by $Li_\alpha Ni_a Co_b Mn_c Ti_d M_e O_{2+\delta}$ wherein α is from 1 to 1.8, a is from 0.15 to 0.5, b is from 0 to 0.09, c is from 0.33 to 0.8, d is from 0.01 to 0.1, e is from 0 to 0.1, δ is from 0 to 0.8, a+b+c+d+e=1, and M is Mg, Al, Ca or the like, wherein in an X-ray diffraction pattern, the ratio ($H_{020}/H_{003}$) of the height of a peak of (020) plane assigned to a crystal structure with space group C2/m to the height of a peak of (Continued)

(003) plane assigned to a crystal structure with space group R-3m is at least 0.02, and $D_{90}/D_{10}$ is at most 4.

8 Claims, 1 Drawing Sheet

(51) Int. Cl.
  *H01M 10/0525* (2010.01)
  *H01M 4/525* (2010.01)
  *H01M 4/02* (2006.01)

(56) References Cited

U.S. PATENT DOCUMENTS

| | | |
|---|---|---|
| 2015/0034863 A1 | 2/2015 | Ito et al. |
| 2015/0060725 A1 | 3/2015 | Yamamoto et al. |
| 2016/0043396 A1 | 2/2016 | Sakai et al. |
| 2016/0056462 A1 | 2/2016 | Sakai et al. |

FOREIGN PATENT DOCUMENTS

| | | | |
|---|---|---|---|
| JP | 2002-145623 | A | 5/2002 |
| JP | 2006-269308 | A | 10/2006 |
| JP | 2007-184145 | A | 7/2007 |
| JP | 2008-147068 | A | 6/2008 |
| JP | 2008-1471068 | * | 6/2008 |
| JP | 2015-140292 | A | 8/2015 |
| JP | 2015-159043 | A | 9/2015 |
| WO | 2013/125465 | A1 | 8/2013 |
| WO | 2013/146287 | A1 | 10/2013 |
| WO | 2014/175191 | A1 | 10/2014 |
| WO | 2014/192758 | A1 | 12/2014 |
| WO | 2014/192759 | A1 | 12/2014 |

OTHER PUBLICATIONS

International Search Report dated Aug. 15, 2017 issued in International Patent Application No. PCT/JP2017/019062 (with English translation).

Korean Office Action issued in corresponding Korean Patent Application No. 10-2018-7033645, dated Aug. 23, 2021, with partial English translation.

* cited by examiner

CATHODE ACTIVE MATERIAL, ITS PRODUCTION PROCESS, AND POSITIVE ELECTRODE FOR LITHIUM ION SECONDARY BATTERY

CROSS REFERENCE

This patent application is the U.S. National Phase under 35 U.S.C. § 371 of International Application No. PCT/JP2017/019062, filed on May 22, 2017, which claims the benefit of Japanese Patent Application No. 2016-103134, filed on May 24, 2016, the entire contents of each are hereby incorporated by reference.

TECHNICAL FIELD

The present invention relates to a cathode active material, its production process, a positive electrode for a lithium ion secondary battery, and a lithium ion secondary battery.

BACKGROUND ART

As a cathode active material contained in a positive electrode of a lithium ion secondary battery, a lithium-containing composite oxide, particularly $LiCoO_2$, is well known. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

As a cathode active material which may be able to further increase the discharge capacity of a lithium ion secondary battery, a cathode active material having high Li and Mn contents i.e. a so-called lithium rich cathode active material has attracted attention. However, a lithium ion secondary battery using such a lithium rich cathode active material has a problem such that the characteristics to maintain the charge and discharge capacity at the time of repeating a charge and discharge cycle (hereinafter referred to as the cycle characteristics) tend to decrease.

As a lithium rich cathode active material capable of obtaining a lithium ion secondary battery excellent in the cycle characteristics, the following (1) and the like have been proposed.

(1) A cathode active material for a non-aqueous electrolyte secondary battery, produced by a production process comprising a first step of spray-drying a raw material mixed solution having a citrate of at least one member selected from the group consisting of Ti, Zr and Nb, an organic acid salt of at least one member selected from the group consisting of Ni, Mn and Co, having a decomposition temperature of from 100° C. to 350° C., and an organic acid salt of lithium having a decomposition temperature of from 100° C. to 350° C. dissolved in an aqueous solvent to obtain a dried product, a second step of thermally decomposing the salts contained in the dried product obtained in the first step to obtain a precursor, and a third step of firing the precursor obtained in the second step at from 400 to 1,000° C. (Patent Document 1).

PRIOR ART DOCUMENT

Patent Document

Patent Document 1: JP-A-2015-159043

DISCLOSURE OF INVENTION

Technical Problem

However, the cathode active material of the above (1) obtained by the spray-drying method has a wide particle size distribution and contains coarse particles in a large amount. Accordingly, in a case where the cathode active material of the above (1) is contained in a cathode active material layer of a positive electrode of a lithium ion secondary battery, electric current is likely to concentrate on the course particles protruding from the surface of the cathode active material layer. As a result, the cathode active material in the form of the coarse particles is likely to deteriorate, and the cycle characteristics of the lithium ion secondary battery are likely to decrease. Further, relatively expensive organic acid salts used as the raw material metal salts increase the cost.

It is an object of the present invention to provide a lithium rich cathode active material with which it is possible to obtain a lithium ion secondary battery having a high discharge capacity and being excellent in the cycle characteristics and its production process; a positive electrode for a lithium ion secondary battery with which it is possible to obtain a lithium ion secondary battery having a high discharge capacity and being excellent in the cycle characteristics; and a lithium ion secondary battery having a high discharge capacity and being excellent in the cycle characteristics.

Solution to Problem

The present invention provides the following embodiments.

<1> A cathode active material comprising particles of a lithium-containing composite oxide, the lithium-containing composite oxide being represented by $Li_\alpha Ni_a Co_b Mn_c Ti_d M_e O_{2+\delta}$ wherein $\alpha$ is from 1 to 1.8, "a" is from 0.15 to 0.5, b is from 0 to 0.09, c is from 0.33 to 0.8, d is from 0.01 to 0.1, e is from 0 to 0.1, $\delta$ is from 0 to 0.8, a+b+c+d+e=1, and M is at least one member selected from the group consisting of Mg, Al, Ca, V, Cr, Fe, Cu, Zn, Ga, Ge, Sr, Y, Nb, Mo, Sn, Ba, La and Ce, wherein in an X-ray diffraction pattern of the lithium-containing composite oxide, the ratio ($H_{020}/H_{003}$) of the height ($H_{020}$) of a peak of (020) plane assigned to a crystal structure with space group C2/m to the height ($H_{003}$) of a peak of (003) plane assigned to a crystal structure with space group R-3m is at least 0.02, and $D_{90}/D_{10}$ of the cathode active material is at most 4.

<2> The cathode active material according to the above <1>, wherein the specific surface area of the cathode active material is at most 2.05 m²/g.

<3> The cathode active material according to the above <1> of <2>, wherein $D_{50}$ of the cathode active material is from 3 to 15 μm.

<4> The cathode active material according to any one of the above <1> to <3>, wherein in an X-ray diffraction pattern of the lithium-containing composite oxide, the crystallite size obtained by the Scherrer equation from a peak of (003) plane assigned to a crystal structure with space group R-3m is from 30 to 120 nm.

<5> The cathode active material according to any one of the above <1> to <4>, wherein in an X-ray diffraction pattern of the lithium-containing composite oxide, the crystallite size obtained by the Scherrer equation from a peak of (110) plane assigned to a crystal structure with space group R-3m is from 10 to 80 nm.

<6> A process for producing a cathode active material comprising particles of a lithium-containing composite oxide, the process comprising:
mixing a water-soluble metal salt containing a water-soluble salt of Ni, a water-soluble salt of Mn and a water-soluble salt of Ti, and an alkali source, in a state of an aqueous solution to precipitate a hydroxide, and firing a mixture obtained by mixing the hydroxide and a lithium compound, at a temperature of from 850 to 1,100° C. to obtain the particles of a lithium-containing composite oxide.
<7> The process for producing a cathode active material according to the above <6>, wherein the water-soluble salt is a sulfate.
<8> The process for producing a cathode active material according to the above <6> or <7>, wherein the alkali source is sodium hydroxide.
<9> The process for producing a cathode active material according to any one of the above <6> to <8>, wherein the lithium compound is lithium carbonate.
<10> The process for producing a cathode active material according to any one of the above <6> to <9>, wherein the pH of a mixed liquid obtained by mixing the water-soluble metal salt and the alkali source in a state of an aqueous solution is from 10 to 12.
<11> The process for producing a cathode active material according to any one of the above <6> to <10>, wherein when the water-soluble metal salt and the alkali source are mixed in a state of an aqueous solution to precipitate the hydroxide, ammonium sulfate is added so that the ratio ($NH_4^+$/X) of the molar amount ($NH_4^+$) of ammonium ions to the molar amount (X) of metals contained in the water-soluble metal salt is from 0.01 to 0.2.
<12> The process for producing a cathode active material according to any one of the above <6> to <11>, wherein the temperature when the water-soluble metal salt and the alkali source are mixed in a state of an aqueous solution to precipitate the hydroxide, is from 30 to 70° C.
<13> A positive electrode for a lithium ion secondary battery, which comprises a cathode active material layer containing the cathode active material as defined in any one of the above <1> to <5>, an electrically conductive material and a binder, on a positive electrode current collector.
<14> A lithium ion secondary battery, which comprises the positive electrode for a lithium ion secondary battery as defined in the above <13>, a negative electrode, a separator and a non-aqueous electrolyte.

Advantageous Effects of Invention

According to the cathode active material of the present invention, it is possible to obtain a lithium ion secondary battery having a high discharge capacity and being excellent in the cycle characteristics.

According to the process for producing a cathode active material of the present invention, it is possible to obtain a cathode active material with which a lithium ion secondary battery having a high discharge capacity and being excellent in the cycle characteristics, can be obtained.

According to the positive electrode for a lithium ion secondary battery of the present invention, it is possible to obtain a lithium ion secondary battery having a high discharge capacity and being excellent in the cycle characteristics.

The lithium ion secondary battery of the present invention has a high discharge capacity and is excellent in the cycle characteristics.

DESCRIPTION OF EMBODIMENTS

The following definitions of terms are applied to this specification including Claims.

The "activation treatment" means a treatment to withdraw a predetermined amount of $Li_2O$ from the lithium-containing composite oxide contained in the lithium rich cathode active material. This treatment makes the lithium rich cathode active material be capable of being charged and discharged. Conditions for the activation treatment are not particularly limited. As a specific method of the activation treatment, the method disclosed in Examples may be employed.

The "specific surface area" is a specific surface area measured by a BET (Brunauer, Emmet, Teller) method from an adsorption isotherm. In the measurement of the adsorption isotherm, nitrogen gas is used as an adsorption gas. Further, in the measurement of the adsorption isotherm of a hydroxide, a hydroxide dried under conditions as disclosed in Examples is used.

The "$D_{50}$" is a particle size at a point of 50% on an accumulative volume distribution curve which is drawn by obtaining the particle size distribution on the volume basis and taking the whole to be 100%, that is, a volume-based accumulative 50% size.

The "$D_{10}$" is a particle size at a point of 10% on an accumulative volume distribution curve which is drawn by obtaining the particle size distribution on the volume basis and taking the whole to be 100%, that is, a volume-based accumulative 10% size.

The "$D_{90}$" is a particle size at a point of 90% on an accumulative volume distribution curve which is drawn by obtaining the particle size distribution on the volume basis and taking the whole to be 100%, that is, a volume-based accumulative 90% size.

The "particle size distribution" is obtained from the frequency distribution and accumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The "crystallite size" is obtained by the following Scherrer equation from a diffraction angle 2θ (deg) and half-value width B (rad) of a peak of specific plane (abc) in an X-ray diffraction pattern. In the following formula, $D_{abc}$ is a crystallite size of (abc) plane, and λ is the wavelength of X-rays.

$$D_{abc}=(0.9\lambda)/(B \cos \theta)$$

The "hydroxide" includes a hydroxide and an oxyhydroxide in which a hydroxide is partially oxidized. That is, a compound represented by $Z(OH)_2$ (wherein Z is a metal element other than Li) includes $Z(OH)_2$, ZOOH and a mixture thereof.

The expression "Li" means a Li element, not a Li metal simple substance, unless otherwise specified. The same applies to expressions of other elements such as Ni, Co, Mn, Ti, etc.

The composition analysis of a hydroxide and a lithium-containing composite oxide is carried out by inductively-coupled plasma spectrometry (ICP). Further, the ratio of elements in a lithium-containing composite oxide is a value with respect to the lithium-containing composite oxide before the activation treatment.

<Cathode Active Material>

The cathode active material of the present invention (hereinafter sometimes referred to as the present cathode active material) is a cathode active material contained in a positive electrode of a lithium ion secondary battery and contains particles of a specific lithium-containing composite oxide (hereinafter sometimes referred to simply as a composite oxide). Further, the present cathode active material may comprise particles of the composite oxide or may be in such a form that the surface of the particles of the composite oxide is covered with a covering.

(Lithium-Containing Composite Oxide)

The present cathode active material comprises the composite oxide represented by the following formula 1. Accordingly, a lithium ion secondary battery using the present cathode active material has a high discharge capacity and is excellent in the cycle characteristics.

$$Li_\alpha Ni_a Co_b Mn_c Ti_d M_e O_{2+\delta}$$ Formula 1 wherein α, "a", b, c, d, e, δ and M are as defined above, and are respectively preferably as follows.

In the formula 1, when α is within the above range, the discharge capacity of the lithium ion secondary battery will be high. α is preferably from 1.1 to 1.7, more preferably from 1.3 to 1.7.

In the formula 1, when "a" is within the above range, the discharge capacity and the discharge voltage of the lithium ion secondary battery will be high. "a" is preferably from 0.2 to 0.5, more preferably from 0.2 to 0.4. In the formula 1, when b is within the above range, the rate characteristics of the lithium ion secondary battery will be excellent. b is preferably from 0 to 0.07, more preferably from 0 to 0.05.

In the formula 1, when c is within the above range, the discharge voltage and the discharge capacity of the lithium ion secondary battery will be high. c is preferably from 0.45 to 0.8, more preferably from 0.5 to 0.78.

In the formula 1, when d is within the above range, the cycle characteristics of the lithium ion secondary battery will be excellent. d is preferably from 0.02 to 0.1, more preferably from 0.02 to 0.08.

In the formula 1, when e is within the above range, the effects of the present invention will not be impaired. e is preferably from 0 to 0.05, more preferably from 0 to 0.03.

In the formula 1, 2+δ which represents the molar ratio of oxygen (O) is the molar ratio of oxygen required to satisfy valences of Li, Ni, Co, Mn, Ti and M.

The composite oxide may contain, as the case requires, at least one other element M selected from the group consisting of Mg, Al, Ca, V, Cr, Fe, Cu, Zn, Ga, Ge, Sr, Y, Nb, Mo, Sn, Ba, La and Ce. Such other element contained in the composite oxide is preferably at least one member selected from the group consisting of Mg, Al, Cr and Fe, with a view to achieving a higher discharge capacity of the lithium ion secondary battery.

In a case where the composite oxide contains no Ti and M, it is in the form of a solid solution of $Li(Li_{1/2}Mn_{2/3})O_2$ (lithium excess phase) having a layered rock salt crystal structure with space group C2/m and $LiZO_2$ (wherein Z is Ni and Mn and contains Co as the case requires) having a layered rock salt crystal structure with space group R-3m. In a case where it contains Ti, a part of Mn in the layered rock salt crystal structure is substituted with Ti which is also tetravalent. In a case where it contains Zr or Si which is a tetravalent element other than Ti, Mn in the layered rock salt crystal structure is not substituted, and impurities containing Zr or Si may be precipitated.

The solid solution type lithium-containing composite oxide having a crystal structure with space group C2/m and a crystal structure with space group R-3m can be confirmed by X-ray diffraction measurement.

The X-ray diffraction measurement is carried out by the method under conditions as disclosed in Examples. The peak of (003) plane assigned to a crystal structure with space group R-3m is a peak which appears at 2θ=18 to 20 deg. The peak of (110) plane assigned to a crystal structure with space group R-3m is a peak which appears at 2θ=64 to 66 deg. The peak of (020) plane assigned to a crystal structure with space group C2/m is a peak which appears at 2θ=20 to 22 deg.

The composite oxide is such that in an X-ray diffraction patter, the ratio ($H_{020}/H_{003}$) of the height ($H_{020}$) of a peak of (020) plane assigned to a crystal structure with space group C2/m to the height ($H_{003}$) of a peak of (003) plane assigned to a crystal structure with space group R-3m is at least 0.02. Presence of a peak of (020) plane assigned to a crystal structure with space group C2/m in the composite oxide means that a lithium excess phase is present in the composite oxide. Accordingly, when $H_{020}/H_{003}$ is at least 0.02, the discharge capacity of the lithium ion secondary battery can be made high. $H_{020}/H_{003}$ is preferably at least 0.025, more preferably at least 0.03. $H_{020}/H_{003}$ is preferably at most 0.1, in that the rate characteristics of the lithium ion secondary battery can easily be made favorable.

In the composite oxide, $D_{003}$ is preferably from 30 to 120 nm, more preferably from 60 to 140 nm, still more preferably from 80 to 115 nm. When $D_{003}$ is at least the above lower limit value, the cycle characteristics of a lithium ion secondary battery having a cathode active material containing the composite oxide can easily be made good. When $D_{003}$ is at most the above upper limit value, the discharge capacity of a lithium ion secondary battery having a cathode active material containing the composite oxide can easily be made high.

In the composite oxide, $D_{110}$ is preferably from 10 to 80 nm, more preferably from 30 to 80 nm, still more preferably from 40 to 70 nm. When $D_{110}$ is at least the above lower limit value, the stability of the crystal structure will improve. When $D_{003}$ is at most the above upper limit value, the cycle characteristics of a lithium ion secondary battery having a cathode active material containing the composite oxide can easily be made good.

(Covering)

In the present cathode active material, when the particles of the composite oxide have a covering on their surface, the frequency in contact of the composite oxide and the non-aqueous electrolyte decreases. As a result, it is possible to reduce elution, into the non-aqueous electrolyte, of transition metal elements such as Mn, etc. in the composite oxide during the charge and discharge cycles, whereby the cycle characteristics of the lithium ion secondary battery can be made more excellent.

As the covering, an Al compound (such as $Al_2O_3$, AlOOH or $Al(OH)_3$) is preferred, since it is thereby possible to make the cycle characteristics of the lithium ion secondary battery more excellent without lowering other battery characteristics.

The covering may be present on the surface of the particles of the composite oxide, and it may be present over the entire surface of the particles of the composite oxide or may be present on a part of the particles of the composite oxide. Further, since the particles of the composite oxide are usually secondary particles having primary particles agglomerated, the covering may be present on the surface of primary particles of the composite oxide or may be present on the surface of secondary particles. The presence of the covering can be confirmed by a contrast of a reflection image of a scanning electron microscope (SEM) or by an electron probe microanalyzer (EPMA).

The amount of the covering is preferably at least 0.01%, more preferably at least 0.05%, particularly preferably at least 0.1% by the ratio of the mass of the covering to the mass of the composite oxide. The mass ratio of the covering is preferably at most 10%, more preferably at most 5%, particularly preferably at most 3% to the mass of the composite oxide. By the presence of the covering on the surface of the particles of the composite oxide, an oxidation reaction of the non-aqueous electrolyte on the surface of the particles of the composite oxide can be suppressed, and the battery life can be improved.

(Cathode Active Material)

The specific surface area of the present cathode active material is preferably at most 2.05 m$^2$/g, more preferably from 0.5 to 2.05 m$^2$/g, still more preferably from 1 to 2.05 m$^2$/g. When the specific surface area is at least the lower limit value of the above range, the discharge capacity of the lithium ion secondary battery tends to be higher. When the specific surface area is at most the upper limit value of the above range, the cycle characteristics of the lithium ion secondary battery can be made more excellent. The specific surface area of the present cathode active material is measured by the method disclosed in Examples.

$D_{90}/D_{10}$ of the present cathode active material is at most 4, preferably at most 3.5, more preferably at most 3. When $D_{90}/D_{10}$ is within the above range, the lithium ion secondary battery will be excellent in the cycle characteristics, from the after-mentioned reasons. The lower limit of $D_{90}/D_{10}$ is preferably as small as possible and is not limited.

$D_{50}$ of the present cathode active material is preferably from 3 to 15 μm, more preferably from 3 to 12 μm, still more preferably from 4 to 10 μm. When $D_{50}$ is within the above range, the discharge capacity of the lithium ion secondary battery can easily be made high.

The above-described present cathode active material is a so-called lithium rich cathode active material comprising the composite oxide represented by the formula 1, and $H_{020}/H_{003}$ of the composite oxide is at least 0.02, and accordingly it is possible to obtain a lithium ion secondary battery having a high discharge capacity. Further, since a part of Mn in the crystal structure of the composite oxide is substituted with stable Ti which is tetravalent, it is possible to obtain a lithium ion secondary battery excellent in the cycle characteristics.

Further, since $D_{90}/D_{10}$ of the present cathode active material is at most 4, the proportion of coarse particles contained in the present cathode active material is very low. Accordingly, when the cathode active material is contained in the cathode active material layer in the positive electrode of a lithium ion secondary battery, the surface of the cathode active material layer tends to be flat, and electric current is less likely to concentrate on a specific cathode active material. Further, the cathode active material is less likely to deteriorate, and a lithium ion secondary battery excellent in the cycle characteristics will be obtained.

<Process for Producing Cathode Active Material>

The present cathode active material may be produced by a process comprising the following steps (a) to (c).

Step (a): A step of mixing a water-soluble metal salt containing a water-soluble salt of Ni, a water-soluble salt of Mn and a water-soluble salt of Ti, and an alkali source, in a state of an aqueous solution to precipitate a hydroxide.

Step (b): A step of firing a mixture obtained by mixing the hydroxide and a lithium compound, at a temperature of from 850 to 1,100° C. to obtain particles of a lithium-containing composite oxide.

Step (c): A step of forming a covering on the surface of the particles of the lithium-containing composite oxide as the case requires.

(Step (a))

As a method of precipitating a hydroxide in the step (a), an alkali coprecipitation method may be mentioned. The alkali coprecipitation method is a method wherein a metal salt aqueous solution containing Ni, Mn and Ti and as the case requires, containing Co, and a pH adjusting liquid containing an alkali source, are continuously supplied to a reactor and mixed, and a hydroxide containing Ni, Mn and Ti and as the case requires, containing Co, is precipitated while the pH of the mixed liquid is kept constant.

The water-soluble metal salt may be a nitrate, an acetate, a chloride or a sulfate of each metal element, and a sulfate is preferred, since the material cost is relatively low, and excellent battery characteristics are thereby obtainable. As the water-soluble metal salt, a sulfate of Ni, a sulfate of Mn, a sulfate of Ti and a sulfate of Co are more preferred.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The sulfate of Ti may, for example, be titanium(III) sulfate, titanium(IV) sulfate or a hydrate thereof.

The ratio of Ni, Co, Mn and Ti in the aqueous metal salt solution is adjusted to be the same as the ratio of Ni, Co, Mn and Ti to be contained in the finally obtainable composite oxide (1).

The total concentration of Ni, Co, Mn and Ti in the aqueous metal salt solution is preferably from 0.1 to 3 mol/kg, more preferably from 0.5 to 2.5 mol/kg. When the total concentration is at least the above lower limit value, the productivity will be excellent. When the total concentration is at most the above upper limit value, the water-soluble metal salts can be sufficiently dissolved in water.

The aqueous metal salt solution may contain an aqueous medium other than water.

The aqueous medium other than water, may, for example, be methanol, ethanol, 1-propanol, 2-propanol, ethylene glycol, propylene glycol, diethylene glycol, dipropylene glycol, polyethylene glycol, butanediol or glycerin. The proportion of the aqueous medium other than water is preferably from 0 to 20 parts by mass, more preferably from 0 to 10 parts by mass, particularly preferably from 0 to 1 part by mass, per 100 parts by mass of water from the viewpoint of safety, environmental aspect, handling efficiency and costs.

The pH adjusting liquid is preferably an aqueous solution containing a strong alkali as the alkali source.

The strong alkali is preferably at least one member selected from the group consisting of sodium hydroxide, potassium hydroxide and lithium hydroxide, and with a view to keeping the production cost low, more preferably sodium hydroxide.

During the mixing of the aqueous metal salt solution and the pH adjusting liquid, it is preferred to keep the pH of the mixed liquid in the reactor to be a pH set within a range of from 10 to 12, with a view to letting the coprecipitation reaction proceed properly. When the pH is at least 10, the coprecipitate is deemed to be a hydroxide. When the pH is at most 12, $D_{90}/D_{10}$ tends to be at most 4.

The temperature when the aqueous metal salt solution and the pH adjusting liquid are mixed, is preferably from 30 to 70° C., more preferably from 40 to 60° C. When the temperature is at least the lower limit value of the above range, a coprecipitate having a high tap density is likely to be obtained. When the temperature is at most the upper limit value of the above range, a lithium composite oxide which can achieve a higher discharge capacity of a lithium ion secondary battery is likely to be obtained.

To the mixed liquid, a complexing agent (aqueous ammonia or aqueous ammonium sulfate solution) may be added to adjust the solubility of Ni ions, Co ions, Mn ions and Ti ions.

The complexing agent is preferably an aqueous ammonium sulfate solution so that the pH of the mixed liquid is likely to be adjusted to be within the above range.

The addition amount of ammonium sulfate is preferably such an amount that the ratio ($NH_4^+/X$) of the molar amount ($NH_4^+$) of ammonium ions to the molar amount (X) of metals contained in the water-soluble metal salt is preferably from 0.01 to 0.2, more preferably from 0.05 to 0.15. When the addition amount is at least the lower limit value of the above range, a coprecipitate having a high tap density is likely to be obtained. When the addition amount is at most the upper limit value of the above range, a lithium composite oxide which can achieve a high discharge capacity of a lithium ion secondary battery is likely to be obtained.

To the mixed liquid, a water-soluble organic matter (excluding a sugar) may be added so as to obtain a hydroxide in which relatively large pores are present in a relatively large amount.

The water-soluble organic matter may, for example, be an alcohol or an ether. The alcohol may, for example, be methanol, ethanol, 1-propanol, 2-propanol, ethylene glycol, propylene glycol, diethylene glycol, dipropylene glycol, polyethylene glycol, butanediol or glycerine. The water-soluble organic matter is preferably polyethylene glycol in view of low volatility.

Figure 1:
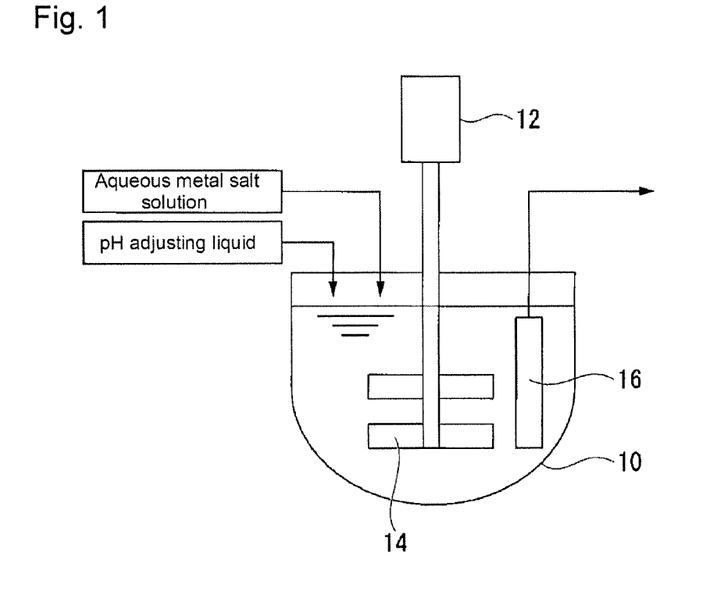
FIG. 1 is a diagram schematically illustrating an example of an apparatus for producing a hydroxide by concentration method.

The aqueous metal salt solution and the pH adjusting liquid are preferably mixed with stirring by a stirring blade 14 attached to a stirring apparatus 12 in a reactor 10, as shown in FIG. 1.

The stirring apparatus may, for example, be a three-one motor, and the stirring blades may, for example, be anchor-type, propeller-type or paddle-type.

Mixing of the aqueous metal salt solution and the pH adjusting liquid is preferably conducted in an inert atmosphere, such as in a nitrogen atmosphere or in an argon atmosphere, with a view to preventing oxidation of the hydroxide. It is particularly preferably conducted in a nitrogen atmosphere from the viewpoint of costs.

As the method for precipitating a hydroxide, two types may be mentioned, i.e. a method (hereinafter referred to as concentration method) of carrying out the precipitation reaction while concentrating the hydroxide by withdrawing the mixed liquid in a reactor 10 through a filter 16 (e.g. a filter cloth), as shown in FIG. 1, and a method (hereinafter referred to as overflow method) of carrying out the precipitation reaction while maintaining the concentration of the hydroxide to be low by withdrawing the mixed liquid in the reactor, together with the hydroxide, without using a filter. The concentration method is preferred, with a view to making the particle size distribution narrow.

The hydroxide is preferably washed to remove impurity ions. The washing method may, for example, be a method of repeating pressure filtration and dispersion into distilled water. Such washing, if conducted, is preferably repeated until the electrical conductivity of the filtrate or the supernatant at the time when the hydroxide is dispersed in distilled water, becomes to be at most 50 mS/m, more preferably at most mS/m.

After the washing, the hydroxide may be dried as the case requires. The drying temperature is preferably from 60 to 200° C., more preferably from 80 to 130° C. When the drying temperature is at least the above lower limit value, the drying time can be shortened. When the drying temperature is at most the above upper limit value, it is possible to prevent the progress of oxidation of the hydroxide.

The drying time may be properly set depending upon the amount of the hydroxide and is preferably from 1 to 300 hours, more preferably from 5 to 120 hours.

The specific surface area of the hydroxide is preferably from 3 to 100 $m^2/g$, more preferably from 5 to 70 $m^2/g$. When the specific surface area is within the above range, the specific surface area of the present cathode active material can be easily controlled to be within a preferred range. Here, the specific surface area is a value measured after the hydroxide is dried at 120° C. for 15 hours.

$D_{50}$ of the hydroxide is preferably from 3.5 to 15.5 μm, more preferably from 3.5 to 12.5 μm, still more preferably from 4.5 to 10.5 μm. When $D_{50}$ is within the above range, $D_{50}$ of the present cathode active material can be easily controlled to be within a preferred range.

(Step (b))

The hydroxide and a lithium compound are mixed and fired, whereby a composite oxide will be formed. The lithium compound is preferably one member selected from the group consisting of lithium carbonate, lithium hydroxide and lithium nitrate. Lithium carbonate is more preferred from the viewpoint of handling efficiency in the production process.

The method for mixing the hydroxide and the lithium compound may, for example, be a method of using a rocking mixer, a Nauta mixer, a spiral mixer, a cutter mill or a V mixer.

The ratio (Li/X) of the molar amount (Li) of Li contained in the lithium compound to the molar amount (X) of metals contained in the hydroxide is preferably from 1 to 1.8, more preferably from 1.1 to 1.7, still more preferably from 1.3 to 1.7. When Li/X is within the above range, the range of a in the composite oxide of the formula 1 can be made to be within a desired range, and the discharge capacity of the lithium ion secondary battery can be made high.

The firing apparatus may, for example, be an electric furnace, a continuous firing furnace or a rotary kiln.

During the firing, the hydroxide is oxidized, and therefore, the firing is preferably conducted in the atmospheric air, and it is particularly preferably conducted while air is supplied. The supply rate of air is preferably from 10 to 200 mL/min., more preferably from 40 to 150 mL/min., per 1 L of the inner volume of the furnace.

By supplying air during the firing, the metal element contained in the hydroxide will be sufficiently oxidized. As a result, it is possible to obtain a composite oxide having high crystallinity and having a crystal structure with space group C2/m and a crystal structure with space group R-3m.

The firing temperature is from 850 to 1,100° C., preferably from 900 to 1,050° C., more preferably from 950 to 1,050° C. When the firing temperature is at least the lower limit value of the above range, $H_{020}/H_{006}$, $D_{003}$ and $D_{110}$ are likely to be within the above ranges. When the firing temperature is at most the upper limit value of the above range, volatilization of Li can be suppressed during the firing, and a composite oxide in accordance with the charge ratio with regard to Li can be obtained. The firing time is preferably from 4 to 40 hours, more preferably from 4 to 20 hours.

The firing may be one-stage firing or two-stage firing i.e. temporary firing followed by main firing. The two-stage firing is preferred since Li thereby tends to be readily uniformly dispersed in the composite oxide. In the case of conducting two-stage firing, main firing is carried out at a temperature within the above firing temperature range. And, the temperature for the temporary firing is preferably from 400 to 700° C., more preferably from 500 to 650° C.

(Step (c))

The method for forming the covering may, for example, be a powder mixing method, a gas phase method, a spray coating method or a dipping method. The following description will be made with reference to a case where the covering is an Al compound.

The powder mixing method is a method of mixing the particles of the composite oxide and the Al compound, followed by heating. The gas phase method is a method of gasifying an organic compound containing Al, such as aluminum ethoxide, aluminum isopropoxide or aluminum acetylacetonate, and letting the organic compound be in contact with the surface of the particles of the composite oxide and reacted. The spray coating method is a method of spraying a solution containing Al to the particles of the composite oxide, followed by heating.

Otherwise, a covering containing an Al compound may be formed on the surface of the particles of the composite oxide by contacting to the particles of the composite oxide, e.g. by a spray coating method, an aqueous solution having dissolved in a solvent, a water-soluble Al compound (such as aluminum acetate, aluminum oxalate, aluminum citrate, aluminum lactate, basic aluminum lactate or aluminum nitrate) to form an Al compound, followed by heating to remove the solvent.

In the above-described process for producing the present cathode active material, a mixture obtained by mixing the hydroxide and the lithium compound is fired at a temperature of from 850 to 1,100° C. Accordingly, by adjusting Li/X to be within a proper range, it is possible to produce a lithium rich cathode active material with which it is possible to obtain a lithium ion secondary battery having a high discharge capacity.

Further, since a so-called coprecipitation method is employed in which a water-soluble metal salt containing a water-soluble salt of Ni, a water-soluble salt of Mn and a water-soluble salt of Ti and an alkali source, are mixed in a state of an aqueous solution to precipitate a hydroxide, a part of Mn in the crystal structure of the composite oxide can be uniformly substituted with stable Ti which is tetravalent. Accordingly, it is possible to produce a cathode active material with which it is possible to obtain a lithium ion secondary battery excellent in the cycle characteristics with no purity.

Further, since a coprecipitation method is employed, it is possible to obtain a hydroxide with narrow particle size distribution as compared with the spray drying method. Accordingly, it is possible to make the particle size distribution of the particles of the composite oxide narrow, specifically, to make $D_{90}/D_{10}$ of the cathode active material to be at most 4. Accordingly, it is possible to produce a cathode active material with which it is possible to obtain a lithium ion secondary battery excellent in the cycle characteristics.

Further, according to the method of preliminarily adding Ti when a hydroxide is to be obtained by the coprecipitation method, there are advantages such that a single phase is likely to be obtained even if the amount of Ti is increased, the composition will not change, and the number of steps will not increase and the cost will not increase, as compared with a method of substituting a part of Mn in the crystal structure with Ti by post-doping.

<Positive Electrode for Lithium Ion Secondary Battery>

The positive electrode for a lithium ion secondary battery of the present invention (hereinafter referred to as the present positive electrode) contains the present cathode active material. Specifically, the positive electrode comprises a cathode active material layer containing the present cathode active material, an electrically conductive material and a binder, on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present cathode active material, the electrically conductive material and the binder are dissolved or dispersed in a medium to obtain a slurry. The obtained slurry is applied to the positive electrode current collector, and the medium is removed e.g. by drying to form a cathode active material layer. As the case requires, the cathode active material layer may be pressed e.g. by roll pressing. The present positive electrode is obtained in such a manner.

Otherwise, the present cathode active material, the electrically conductive material and the binder are kneaded with a medium to obtain a kneaded product. The obtained kneaded product is pressed on the positive electrode current collector to obtain the present positive electrode.

<Lithium Ion Secondary Battery>

The lithium ion secondary battery of the present invention (hereinafter referred to as the present battery) has the present positive electrode. Specifically, it comprises the present positive electrode, a negative electrode, a separator and a non-aqueous electrolyte.

(Negative Electrode)

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si. As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used.

As the negative electrode current collector, a metal foil such as a nickel foil or a copper foil may be mentioned.

The negative electrode may be produced, for example, in such a manner that the anode active material, the electrically conductive material and the binder are dissolved or dispersed in a medium to obtain a slurry, the obtained slurry is applied to the negative electrode current collector, and the medium is removed e.g. by drying, followed by pressing to obtain the negative electrode.

(Non-Aqueous Electrolyte)

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). As the organic solvent, one type may be used alone, or two or more types may be used in combination.

As the inorganic solid electrolyte, a material having lithium ion conductivity may be used. The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. As the polymer compound, one type may be used alone, or two or more types may be used in combination.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

EXAMPLES

Now, the present invention will be described in detail with reference to Examples, but it should be understood that the present invention is by no means thereby restricted. Ex. 2, 4, 6, 8 and 9 are Examples of the present invention, and Ex. 1, 3, 5, 7 and 10 are Comparative Examples.

(Particle Size Distribution)

The hydroxide or the cathode active material was sufficiently dispersed in water by ultrasonic treatment, and the measurement was conducted by a laser diffraction/scattering type particle size distribution measuring apparatus (MT-3300EX manufactured by NIKKISO CO., LTD.), to obtain the frequency distribution and cumulative volume distribution curve, whereby the volume-based particle size distribution was obtained. From the obtained cumulative volume distribution curve, $D_{10}$, $D_{50}$ and $D_{90}$ were obtained.

(Specific Surface Area)

The specific surface area of the hydroxide or the cathode active material was calculated by a nitrogen adsorption BET method using a specific surface area measuring apparatus (HM model-1208, manufactured by Mountech Co., Ltd.). Degassing was carried out at 105° C. for 1 hour for the hydroxide and at 200° C. for 20 minutes for the cathode active material.

(Composition Analysis)

Composition analysis of the hydroxide and the composite oxide was carried out by a plasma emission spectroscope (SPS3100H manufactured by SII NanoTechnology Inc.). From the ratio of the molar amounts of Li, Ni, Co and Mn obtained from the composition analysis, ratios (Ni/X, Co/X, Mn/X and Ti/X) of the molar amounts of Ni, Co, Mn an Ti to the total molar amount (X) of Ni, Co, Mn and Ti in the hydroxide, and α, "a", b, c and d in the composite oxide $Li_\alpha Ni_a Co_b Mn_c Ti_d M_e O_{2+\delta}$ were calculated.

(X-Ray Diffraction)

The X-ray diffraction of the composite oxide was measured by means of an X-ray diffraction apparatus (manufactured by Rigaku Corporation, apparatus name: SmartLab). The measurement conditions are shown in Table 1. The measurement was carried out at 25° C. Before measurement, 1 g of the composite oxide and 30 mg of standard sample 640e for X-ray diffraction were mixed in an agate mortar, and this mixture was used as the sample for the measurement.

With respect to the X-ray diffraction pattern obtained, peak search was carried out by using integrated X-ray powder diffraction software PDXL2 manufactured by Rigaku Corporation. From the respective peaks, $H_{020}/H_{003}$, $D_{003}$ and $D_{110}$ were obtained.

TABLE 1

| Apparatus condition | Measurement apparatus | SmartLab manufactured by Rigaku Corporation |
|---|---|---|
| | Target | Cu |
| | Detector | D/teX Ultra HE manufactured by Rigaku Corporation |
| | Detector baseline | 44div |
| | Detector window | 8div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 70 (deg.) |
| | Step (deg.) | 0.0052 (deg.) |
| | Speed measurement time | 1 (deg./min.) |
| | IS (deg.) | ⅓ (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, χ threshold: 1.50 |
| | Background removal | Fitting |
| | Kα2 removal | Intensity ratio: 0.4970 |
| | Peak search | Secondary differentiation, σ cut: 3.00 |
| | Profile fitting | Fitting of measurement data |
| | Peak shape | Variance pseudo-voigt function |

(Production of Positive Electrode Sheet)

The cathode active material obtained in each Ex., electrically conductive carbon black as an electrically conductive material, and polyvinylidene fluoride as a binder were weighed in a mass ratio of 88:6:6, and they were added to N-methylpyrrolidone to prepare a slurry.

The slurry was applied on one side of an aluminum foil as a positive electrode current collector having a thickness of 20 µm by means of a doctor blade. The gap of the doctor blade was adjusted so that the thickness of the sheet after roll pressing would be 20 µm. After drying at 120° C., roll pressing was carried out twice to prepare a positive electrode sheet.

(Production of Lithium Ion Secondary Battery)

The positive electrode sheet was punched out into a rectangle of 24 mm×40 mm, which was used as a positive electrode. Artificial graphite was used as a negative electrode material, and an artificial graphite sheet was punched out into a rectangle of 44 mm×28 mm, which was used as a negative electrode. As a separator, a porous polypropylene having a thickness of 25 µm was used.

As a non-aqueous electrolyte, a non-aqueous electrolytic solution having $LiPF_6$ dissolved at a concentration of 1 mol/dm$^3$ in a solvent mixture of ethylene carbonate and diethyl carbonate in a volume ratio of 3:7, was used.

Using the positive electrode, the negative electrode, the separator and the non-aqueous electrolyte, a laminate type lithium ion secondary battery was assembled in a globe box in a dry atmosphere.

(Activation Treatment)

With respect to each lithium ion secondary battery using the cathode active material in each Ex., constant current charging to 4.75 V with a load current of 26 mA per 1 g of the cathode active material, was carried out.

After the constant current charging, constant current discharging to 2 V with a load current of 26 mA per 1 g of the cathode active material was carried out as an activation treatment. The discharge capacity on that occasion was taken as the initial discharge capacity.

(Cycle Test)

With respect to the lithium ion secondary battery subjected to the activation treatment, constant current and constant voltage charging was carried out for 90 minutes to 4.45 V with a load current of 200 mA per 1 g of the cathode active material, followed by constant current discharging to 2 V with a load current of 200 mA per 1 g of the cathode active material. This charge and discharge cycle was repeated 100 times in total. The 100c/2c cycle capacity retention (%) was obtained in accordance with the following formula from the discharge capacity in the second cycle and the discharge capacity in the 100th cycle.

100c/2c cycle capacity retention (%)=(discharge capacity in the 100th cycle/discharge capacity in the 2nd cycle)×100

Ex. 1

Nickel(II) sulfate hexahydrate (manufactured by KANTO CHEMICAL CO., INC., reagent), cobalt(II) sulfate heptahydrate (manufactured by KANTO CHEMICAL CO., INC., reagent) and manganese(III) sulfate pentahydrate (manufactured by KANTO CHEMICAL CO., INC., reagent) were dissolved in distilled water so that the ratio of molar amounts of Ni, Co and Mn would be as shown in Table 2 and the total amount of the sulfates would be 1.5 mol/kg to obtain an aqueous sulfate solution.

As a pH adjusting liquid, sodium hydroxide was dissolved in distilled water so that the concentration would be 1.5 mol/kg to obtain an aqueous sodium hydroxide solution.

As a complexing agent, ammonium sulfate was dissolved in distilled water so that the concentration would be 1.5 mol/kg to obtain an aqueous ammonium sulfate solution.

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/min and the aqueous ammonium sulfate solution was added at a rate of 0.5 g/min, for 12 hours, and the pH adjusting liquid was added to keep the pH of the mixed liquid to be 10.5, to precipitate a hydroxide containing Ni, Co and Mn. During the addition of the raw material solutions, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m or lower, and the hydroxide was dried at 120° C. for 15 hours.

The hydroxide and lithium carbonate were mixed so that the ratio of the molar amount of Li to the total molar amount (X) of Ni, Co, Mn and Ti (Li/X) would be as identified in Table 3, to obtain a mixture.

In an electric furnace, while supplying air, the mixture was subjected to temporary firing at 600° C. in air over a period of 3 hours to obtain a temporarily fired product.

Figure 2:
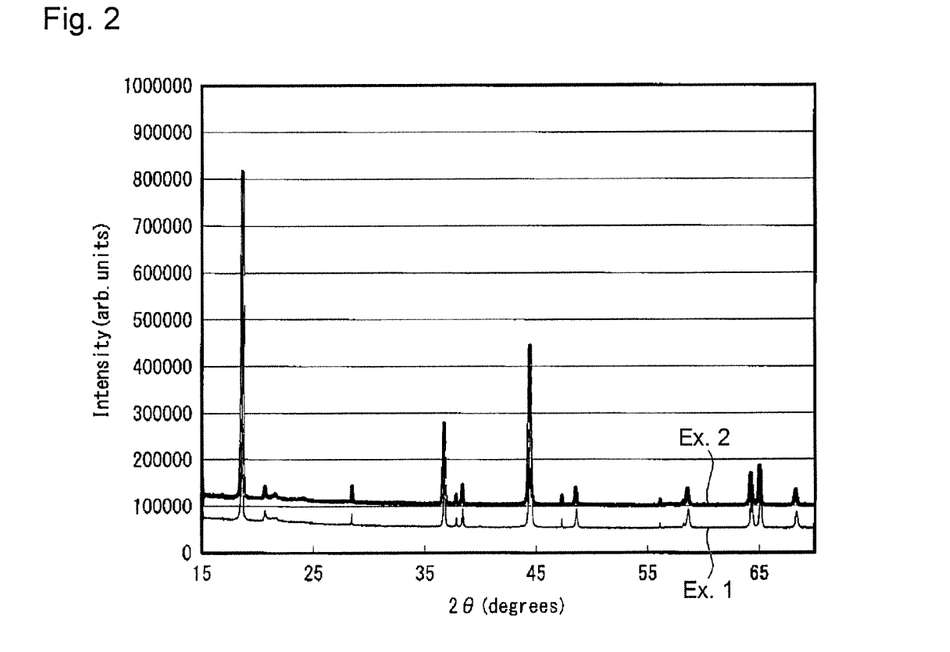
FIG. 2 is a diagram illustrating X-ray diffraction patterns of the lithium-containing composite oxides in Ex. 1 and 2.

In an electric furnace, while supplying air, the temporarily fired product was subjected to main firing at 990° C. in air over a period of 16 hours to obtain particles of a composite oxide. The particles of a composite oxide were used as a cathode active material. The results of the measurements and the evaluations are shown in Tables 2 to 4 and FIG. 2.

Ex. 2

Nickel(II) sulfate hexahydrate, cobalt(II) sulfate heptahydrate, manganese(II) sulfate pentahydrate and an aqueous titanium(IV) sulfate aqueous solution having a concentration of 24 mass % (manufactured by Kanto Chemical Co., Inc., reagent) were dissolved in distilled water so that the ratio of molar amounts of Ni, Co, Mn and Ti would be as shown in Table 2 and the total amount of the sulfates would be 1.5 mol/kg to obtain an aqueous sulfate solution.

A hydroxide and particles of a composite oxide in Ex. 2 were obtained in the same manner as in Ex. 1 except that the aqueous sulfate solution in Ex. 2 was used. The particles of a lithium-containing composite oxide were used as a cathode active material. The results of the measurements and the evaluations are shown in Tables 2 to 4 and FIG. 2.

Ex. 3, 5 and 7

A hydroxide and particles of a composite oxide in each of Ex. 3, 5 and 7 were obtained in the same manner as in Ex. 1 except that the charge and the conditions are as identified in Tables 2 and 3. The particles of a composite oxide were used as a cathode active material. The results of the measurements and the evaluations are shown in Tables 2 to 4.

Ex. 4, 6 and 8

A hydroxide and particles of a composite oxide in each of Ex. 4, 6 and 8 were obtained in the same manner as in Ex. 2 except that the charge and the conditions are as identified in Tables 2 and 3. The particles of a composite oxide were used as a cathode active material. The results of the measurements and the evaluations are shown in Tables 2 to 4.

Ex. 9

A hydroxide and particles of a composite oxide in Ex. 9 were obtained in the same manner as in Ex. 4 except that polyethylene glycol (manufactured by Kanto Chemical Co., Inc., PEG #6000) as a water-soluble organic matter was added to the aqueous sulfate solution so that the ratio (polyethylene glycol/hydroxide) of the mass of polyethylene glycol to the mass of the hydroxide to be obtained would be 0.05, and the temperature at main firing was changed. The particles of the composite oxide were used as a cathode active material. The results of the measurements and the evaluations are shown in Tables 2 to 4.

Ex. 10

A titanium citrate solution having a concentration of 9.1 mass % as calculated as $TiO_2$ was prepared.

55.4 g of lithium acetate dihydrate (manufactured by Kanto Chemical Co., Inc., reagent), 21.7 g of nickel acetate tetrahydrate (manufactured by Kanto Chemical Co., Inc., reagent), 59.8 g of manganese acetate tetrahydrate (manufactured by Kanto Chemical Co., Inc., reagent), 15.4 g of the titanium citrate solution and 134.8 g of citric acid (manufactured by Kanto Chemical Co., Inc., reagent) were dissolved in 1,148.0 g of distilled water to obtain an aqueous solution.

The aqueous solution was dried by a spray drier (manufactured by Yamato Scientific Co., Ltd., GS-310) at a liquid-sending rate of 5 mL/min. Spray drying was conducted while nitrogen was made to flow at an inlet temperature of 160° C. The spray pressure was 0.12 MPa, and the orifice pressure was 0.7 kPa. The obtained dried product was heated by a firing furnace (manufactured by MOTOYAMA, SKM-3035F) at 200° C. for 3 hours, at 400° C. for 3 hours and at 600° C. for 12 hours to conduct thermal decomposition treatment thereby to obtain a precursor. The precursor was fired by a firing furnace (manufactured by MOTOYAMA, SKM-3035F) at 990° C. for 12 hours to obtain particles of a composite oxide. The particles of a composite oxide were used as a cathode active material. The results of the measurements and the evaluations are shown in Tables 2 to 4.

TABLE 2

| | Production of hydroxide | | | | | | | | |
|---|---|---|---|---|---|---|---|---|---|
| | Charge [mol %] | | | | Complexing agent charge $NH_4^+/X$ | Water-soluble organic matter | Initial pH | Controlled pH | Reaction time [hr] | Reaction temperature [° C.] |
| Ex. | Ni | Co | Mn | Ti | | | | | | |
| 1 | 28 | 4 | 68 | 0 | 0.1 | — | 10.5 | 10.5 | 12 | 50 |
| 2 | 28 | 4 | 65 | 3 | 0.1 | — | 10.5 | 10.5 | 12 | 50 |
| 3 | 25 | 0 | 75 | 0 | 0.1 | — | 10.5 | 10.5 | 12 | 50 |
| 4 | 25 | 0 | 70 | 5 | 0.1 | — | 10.5 | 10.5 | 12 | 50 |
| 5 | 25 | 0 | 75 | 0 | 0.1 | — | 10.5 | 10.5 | 12 | 50 |
| 6 | 25 | 0 | 70 | 5 | 0.1 | — | 10.5 | 10.5 | 12 | 50 |
| 7 | 25 | 0 | 75 | 0 | 0.1 | — | 10.5 | 10.5 | 5 | 50 |
| 8 | 25 | 0 | 72 | 3 | 0.1 | — | 10.5 | 10.5 | 5 | 50 |

TABLE 2-continued

| | | | | | | | | | | |
|---|---|---|---|---|---|---|---|---|---|---|
| 9 | 25 | 0 | 70 | 5 | 0.1 | PEG | 10.5 | 10.5 | 12 | 50 |
| 10 | 25 | 0 | 70 | 5 | — | — | | | Spray drying | |

Hydroxide

| | Composition analysis | | | | Particle size distribution | | | Specific surface area |
|---|---|---|---|---|---|---|---|---|
| Ex. | Ni/X | Co/X | Mn/X | Ti/X | $D_{10}$ [μm] | $D_{50}$ [μm] | $D_{90}$ [μm] | [m$^2$/g] |
| 1 | 0.28 | 0.04 | 0.68 | 0 | 4.9 | 6.5 | 9.2 | 20.8 |
| 2 | 0.28 | 0.04 | 0.65 | 0.03 | 3.1 | 4.4 | 6.6 | 34.1 |
| 3 | 0.25 | 0 | 0.75 | 0 | 4.9 | 6.5 | 9.3 | 42.0 |
| 4 | 0.25 | 0 | 0.70 | 0.05 | 2.6 | 3.8 | 6.1 | 35.7 |
| 5 | 0.25 | 0 | 0.75 | 0 | 4.9 | 6.5 | 9.3 | 42.0 |
| 6 | 0.25 | 0 | 0.70 | 0.05 | 2.6 | 3.8 | 6.1 | 35.7 |
| 7 | 0.25 | 0 | 0.75 | 0 | 3.9 | 5.2 | 7.4 | 41.2 |
| 8 | 0.25 | 0 | 0.72 | 0.03 | 3.0 | 4.4 | 7.1 | 46.6 |
| 9 | 0.25 | 0 | 0.70 | 0.05 | 4.3 | 6.9 | 11.5 | 52.1 |
| 10 | | | | | Spray drying | | | |

TABLE 3

| | Production of lithium-containing composite oxide | | | | | | | Lithium-containing composite oxide Composition analysis | | | | |
|---|---|---|---|---|---|---|---|---|---|---|---|---|
| | Charge | Temporary firing | | | Main firing | | | $Li_\alpha Ni_a Co_b Mn_c Ti_d O_{2+\delta}$ | | | | |
| Ex. | Li/X | [°C.] | [hr] | Atmosphere | [°C.] | [hr] | Atmosphere | α | a | b | c | d |
| 1 | 1.475 | 600 | 3 | Air | 990 | 16 | Air | 1.44 | 0.28 | 0.04 | 0.68 | 0 |
| 2 | 1.475 | 600 | 3 | Air | 990 | 16 | Air | 1.43 | 0.28 | 0.04 | 0.65 | 0.03 |
| 3 | 1.580 | 600 | 3 | Air | 990 | 16 | Air | 1.54 | 0.25 | 0 | 0.75 | 0 |
| 4 | 1.580 | 600 | 3 | Air | 965 | 16 | Air | 1.55 | 0.25 | 0 | 0.70 | 0.05 |
| 5 | 1.620 | 600 | 3 | Air | 960 | 16 | Air | 1.53 | 0.25 | 0 | 0.75 | 0 |
| 6 | 1.620 | 600 | 3 | Air | 990 | 16 | Air | 1.50 | 0.25 | 0 | 0.70 | 0.05 |
| 7 | 1.600 | 600 | 3 | Air | 1,005 | 16 | Air | 1.52 | 0.25 | 0 | 0.75 | 0 |
| 8 | 1.600 | 600 | 3 | Air | 1,005 | 16 | Air | 1.54 | 0.25 | 0 | 0.70 | 0.03 |
| 9 | 1.580 | 600 | 3 | Air | 990 | 16 | Air | 1.54 | 0.25 | 0 | 0.70 | 0.05 |
| 10 | 1.540 | — | — | — | 990 | 16 | Air | 1.48 | 0.25 | 0 | 0.72 | 0.03 |

TABLE 4

| | Cathode active material | | | | | | | | | |
|---|---|---|---|---|---|---|---|---|---|---|
| | Lithium-containing composite oxide | | | | | | | Specific | Initial | 100 c/2 c |
| | Crystallite size | | Peak height | Particle size distribution | | | | surface area | discharge capacity | cycle capacity |
| Ex. | $D_{003}$ [nm] | $D_{110}$ [nm] | $H_{020}/H_{003}$ | $D_{10}$ [μm] | $D_{50}$ [μm] | $D_{90}$ [μm] | $D_{90}/D_{10}$ | [m$^2$/g] | [mAh/g] | retention |
| 1 | 98.2 | 51.5 | 0.030 | 4.8 | 6.2 | 9.0 | 1.9 | 1.37 | 222.2 | 90.5 |
| 2 | 97.8 | 58.4 | 0.035 | 2.8 | 4.2 | 6.2 | 2.2 | 1.59 | 201.3 | 96.3 |
| 3 | 102.4 | 54.1 | 0.040 | 4.6 | 6.2 | 8.9 | 1.9 | 1.76 | 220.1 | 87.3 |
| 4 | 79.0 | 41.6 | 0.053 | 2.5 | 3.5 | 5.8 | 2.3 | 1.50 | 177.0 | 100.5 |
| 5 | 87.0 | 39.8 | 0.035 | 4.6 | 6.3 | 9.2 | 2.0 | 1.58 | 216.7 | 85.5 |
| 6 | 80.3 | 43.6 | 0.044 | 2.9 | 4.7 | 8.5 | 2.9 | 1.16 | 185.8 | 100.1 |
| 7 | 101.6 | 65.0 | 0.046 | 3.6 | 4.9 | 7.1 | 2.0 | 2.05 | 241.1 | 76.1 |
| 8 | 107.2 | 58.2 | 0.044 | 2.8 | 4.1 | 7.0 | 2.5 | 1.56 | 219.6 | 94.2 |
| 9 | 86.2 | 44.7 | 0.043 | 4.7 | 7.3 | 11.9 | 2.5 | 1.17 | 186.0 | 97.6 |
| 10 | 96.1 | 79.8 | 0.050 | 2.7 | 13.4 | 32.6 | 12.1 | 2.11 | 219.6 | 92.4 |

The lithium ion secondary battery in each of Ex. 2, 4, 6, 8 and 9 in which the cathode active material in Example of the present invention is used, had a sufficient initial discharge capacity, which was slightly low, as compared with the lithium ion secondary battery in each of Ex. 1, 3, 5 and 7 in which the cathode active material in Comparative Example was used. Further, the lithium ion secondary battery in each of Ex. 2, 4, 6, 8 and 9 was excellent in the cycle characteristics as compared with the lithium ion secondary battery in each of Ex. 1, 3, 5 and 7.

INDUSTRIAL APPLICABILITY

By the cathode active material of the present invention, it is possible to obtain a lithium ion secondary battery excellent in the discharge capacity and cycle characteristics.

REFERENCE SYMBOLS

10: reactor, 12: stirring apparatus, 14: stirring blade, 16: filter

The entire disclosure of Japanese Patent Application No. 2016-103134 filed on May 24, 2016 including specification, claims, drawings and summary is incorporated herein by reference in its entirety.

The invention claimed is:

1. A cathode active material comprising particles of a lithium-containing composite oxide, the lithium-containing composite oxide being represented by $Li_\alpha Ni_a Co_b Mn_c Ti_d M_e O_{2+\delta}$ wherein $\alpha$ is from 1 to 1.8, "a" is from 0.15 to 0.5, b is from 0 to 0.09, c is from 0.33 to 0.8, d is from 0.01 to 0.1, e is from 0 to 0.1, $\delta$ is from 0 to 0.8, a+b+c+d+e=1, and M is at least one member selected from the group consisting of Mg, Al, Ca, V, Cr, Fe, Cu, Zn, Ga, Ge, Sr, Y, Nb, Mo, Sn, Ba, La and Ce, wherein in an X-ray diffraction pattern of the lithium-containing composite oxide, the ratio ($H_{020}/H_{003}$) of the height ($H_{020}$) of a peak of (020) plane assigned to a crystal structure with space group C2/m to the height ($H_{003}$) of a peak of (003) plane assigned to a crystal structure with space group R-3m is at least 0.02, and $D_{90}/D_{10}$ of the cathode active material is at most 4.

2. The cathode active material according to claim 1, wherein the specific surface area of the cathode active material is at most 2.05 m$^2$/g.

3. The cathode active material according to claim 1, wherein $D_{50}$ of the cathode active material is from 3 to 15 μm.

4. The cathode active material according to claim 1, wherein in an X-ray diffraction pattern of the lithium-containing composite oxide, the crystallite size obtained by the Scherrer equation from a peak of (003) plane assigned to a crystal structure with space group R-3m is from 30 to 120 nm.

5. The cathode active material according to claim 1, wherein in an X-ray diffraction pattern of the lithium-containing composite oxide, the crystallite size obtained by the Scherrer equation from a peak of (110) plane assigned to a crystal structure with space group R-3m is from 10 to 80 nm.

6. A positive electrode for a lithium ion secondary battery, which comprises a cathode active material layer containing the cathode active material as defined in claim 1, an electrically conductive material and a binder, on a positive electrode current collector.

7. A lithium ion secondary battery, which comprises the positive electrode for a lithium ion secondary battery as defined in claim 6, a negative electrode, a separator and a non-aqueous electrolyte.

8. The cathode active material according to claim 1, wherein $1.1 < \alpha \leq 1.8$.

* * * * *